United States Patent [19]

Palmer

[11] 3,903,295

[45] Sept. 2, 1975

[54] METHOD FOR ENCAPSULATING MATERIALS

[76] Inventor: Edwin Palmer, 6000 Ivydene Ter., Baltimore, Md. 21209

[22] Filed: Apr. 16, 1974

[21] Appl. No.: 461,275

Related U.S. Application Data

[63] Continuation-in-part of Ser. No. 253,770, May 16, 1972, abandoned.

[52] U.S. Cl. .................. 426/289; 426/96; 426/190; 426/294
[51] Int. Cl.² .......................................... A23L 1/222
[58] Field of Search ............ 426/190, 222, 223, 294, 426/289, 98, 96, 328, 323, 443; 424/16, 31, 34, 35; 252/316

[56] References Cited
UNITED STATES PATENTS

| | | | |
|---|---|---|---|
| 2,088,622 | 8/1937 | Stokes et al. ......................... | 426/222 |
| 2,756,177 | 7/1956 | Cannalonga et al. ................. | 99/166 |
| 2,868,646 | 1/1959 | Schapiro ........................ | 426/190 X |
| 3,660,115 | 5/1972 | Revle ............................... | 426/96 X |

OTHER PUBLICATIONS

Hackh's Chemical Dictionary, McGraw-Hill Book Co., New York, 1969, pp. 310, 206.

Primary Examiner—S. Leon Bashore
Assistant Examiner—Kenneth M. Schor
Attorney, Agent, or Firm—Thomas R. Boland

[57] ABSTRACT

A process for encapsulation is provided. Generally, the materials involved are those which tend to lose at least part of their original properties upon exposure to auto-oxidative, thermal, or humid conditions. The process comprises constituting the material to be encapsulated in or as a viscid medium and dispersing the medium as particulates into an atmosphere containing an agitated quantity of a powdered, sorbent, film-forming agent. The dispersed particulates must have a tacky surface. The powdered agent adheres to this tacky surface and sorbs sufficient liquid to form a continuous, substantially non-friable and dry encapsulating film around each of the particulates.

7 Claims, No Drawings

METHOD FOR ENCAPSULATING MATERIALS

CROSS-REFERENCE TO RELATED APPLICATION

This is a continuation-in-part of Ser. No. 253,770 filed May 16, 1972 and now abandoned.

BACKGROUND OF THE INVENTION

This invention relates to encapsulation. More particularly the invention relates to a method for producing dry particulate encapsulated materials which tend to retain their original physical and chemical properties during processing and storage.

It is well known that certain natural and synthetic materials undergo a change in their chemical and/or physical properties when exposed to heating, autooxidative, or humid conditions. For example, aromas, flavors, vitamins, and the like are known to rapidly deteriorate upon exposure to the atmosphere. Flavors, in particular, are subject to changes in properties since they are commonly used in food products which are prepared by processes employing elevated temperatures.

The methods that have been employed in the past for preserving the original qualities of these materials have suffered from one or more impediments. Some, for example, have incorporated the materials in gelled aqueous colloids which are heated to a molten condition and then sprayed into cooling towers where the sprayed particles are collected in a combined agitated mass of water sorbent and non-sorbent powders. While particles treated in this manner may be "free-flowing," they are not encapsulated as such and the coating formed thereon will not prevent oxidative or thermal deterioration.

Other processes encapsulate particles by employing oil-in-water or water-in-oil emulsions which are spray dried to dehydrate. In some cases a pre-drying operation is performed to prevent chemical oxidative deterioration during dehydration but, in any event, such processes are involved and expensive. Furthermore, in most cases the encapsulating films are too thin to preserve the original qualities of the particles, particularly volatile aromas or flavors, which become somewhat altered and diminished over relatively short periods of time.

U.S. Pat. No. 2,088,622 describes a method for preparing flavoring materials by constituting the flavorings in an aqueous emulsion and drying the emulsion either in a vacuum dryer, by spray drying, or by adding a dehydrating agent thereto. This patent describes the formation of a film around the emulsoid by the dehydrating agent but since the agents disclosed are carbohydrates which produce only friable coating, they are readily cracked, permitting degradation of the flavoring materials. Thus, such materials have a relatively short shelf-life. Also, such dehydrating agents form glommules which form undesirable clumps of the materials.

SUMMARY OF THE INVENTION

Accordingly, it is an object of this invention to provide a convenient low-cost method for encapsulating materials so as to protect them from chemical and/or physical oxidative or thermal deterioration for relatively long periods of time.

It is another object of the invention to provide a method for forming a stable, substantially non-friable encapsulating film around ingestible materials, including flavors and vitamins, without the requirement for dehydration at elevated temperatures.

It is a further object of this invention to provide a method for encapsulating particles of volatile flavorings and aromas with substantially dry, non-friable films of sufficient thickness to preserve their original properties.

The process which accomplishes these and other objects of the present invention comprises forming a viscoid medium including the materials to be encapsulated, dispersing said viscid medium into particulate form, having a tacky surface and exposing said particulates to an agitated quantity of a solid, sorbent, film-forming agent so that said agent coats said particulates, absorbs liquid therefrom and forms a continuous encapsulating, substantially dry film around said particulates.

DETAILED DESCRIPTION OF THE INVENTION

The present invention may be used in encapsulating a wide variety of materials including pharmaceuticals, flavorings, aromas, and nutrients. Because the invention may be carried out at room temperature, it is particularly useful in encapsulating materials which have volatile or effusive properties. Whatever the material, it must first be dissolved, suspended or otherwise constituted in or as a viscid or gel-like medium which when dispersed into particulate form will maintain a tacky consistency. The term viscid, as used herein, is defined as having a cohesive and fluid consistency.

In the usual case it will be necessary to suspend the material to be encapsulated in a liquid medium, the viscosity of which is increased to the desired point either by continued addition of the material itself by introducing fillers to the mixture. A wide variety of liquids may be used in forming the viscid medium including mono and polyhydric alcohols, mineral oils, edible oils, and the like, although water is a preferred liquid. Among the fillers which may be used are protein base materials such as gelatin, casein, soy protein, or other vegetable or animal proteins or non-protein base materials such as vegetable gum, for example gum arabic, gum tragacanth, or locust bean gum as well as corn syrup solids, starch, cellulose and starch ethers, carboxy methyl cellulose, polyvinyl alcohols, polysaccharides, and dextran.

Once the viscid medium is prepared, it is dispersed into particulate form by any convenient means. In the usual case, where small particle size may be important, the viscid preparation will be sprayed from a spray head under high pressure into a mixing vessel containing the agitated film-forming agent. In other instances, particles may be formed, for example, by pouring the viscid preparation into the vortex of spinning blades. In any case, it is critical to this invention that when formed, the particulates will have a tacky consistency and thus contain only a relatively small percentage of liquid. When the particulates are introduced to an atmosphere containing an agitated quantity of the film-forming agent, for example, by spraying, the tackiness of the particulates will cause the film-forming agent to adhere to their surfaces, and sorb the liquid in the particulates to form an encapsulating film. It is important to note that because of the tacky consistency of the particulates, the film-forming agent, or powder, coats the surface of the particulates. Where a liquid emulsion is formed into non-tacky particulates, they absorb and envelop a drying powder so that at least a portion of a volatile or auto-oxidative material is left unprotected, ultimately resulting in the production of an unpleasant odor in the material.

The film-forming agents may be any substance which will achieve the above effect, namely, will sorb the liquid from the tacky particulates and form an encapsulating film around those particulates. The film-forming agent which is selected will be determined by the intended use of the encapsulated product. However, it is vitally important that the films produced from this agent are non-friable. Among the preferred film-forming agents are non-protein base materials, such as vegetable gum, for example gum arabic, as well as carboxymethyl cellulose. A preferred particle size for the film-forming agent will be between 100–150 mesh.

EXAMPLE 1

Encapsulation of a Volatile Grape Flavor Oil

This example illustrates the encapsulation of a volatile imitation grape flavoring compound which contains a high percentage of low boiling ingredients such as ethyl acetate, ethyl formate, and acetic acid. A large percentage of these components would be lost in the usual spray drying method of encapsulation.

To 40 grams of water in a suitable mixing vessel was added 20 grams of gum arabic powder. 25 grams of the grape compound was then added slowly and well stirred to form an emulsion. An additional 10 grams of gum arabic were then added and mixed followed by the addition of 30 grams of corn syrup solids to form a thick viscous and smooth, sticky paste. This paste was then sprayed under pressure into a mixing vessel containing finely pulverized gum arabic powder, all of which had passed through a 100 mesh screen. About nine times the amount of Gum Arabic was used for each part of the paste. This was mixed for an additional several minutes resulting in a fine powder. After screening approximately 167 grams were obtained as the yield, with an oil content of 15%.

The ability of the capsules to retain their flavor, or in other words the volatile ingredients, was tested by placing a portion of the yield on an open tray in an incubator that was kept at 40° C. for 12 hours. The incubated yield was compared with the unheated yield by dissolving equivalent amounts of each in water and tasting the resulting drinks.

The tasting method was used rather than the usual method of extracting the oils and checking for any losses since if there were any losses of oil, it would be of the low molecular and volatile components of the grape flavor compound. By tasting and comparing the flavors of the drinks, any losses of the volatile fractions could be readily observed. The taste tests showed no noticeable difference in flavor or strength of the beverages.

EXAMPLE 2

Encapsulation of Acetaldehyde

The usefulness of this process in encapsulating highly volatile and water soluble materials will be illustrated by the following example.

Acetaldehyde is a very desirable flavor ingredient since it is a good flavor enhance, and it is also used to impart a juicy note to many flavors. It has been exceedingly difficult to encapsulate this product since it boils at 21° C., and the vapors are highly explosive in the presence of air. These hazards and obstacles are readily overcome with this process by reducing the working temperature to below the room temperature and by mixing the ingredients in an atmosphere of nitrogen.

50 grams of Purity Gum B E, a treated starch product of the National Starch and Chemical Co., is dissolved in 100 grams of water. To this is added 12.5 grams of acetaldehyde in 12.5 grams of limonene. This is mixed at 5° C.; 25 grams of gum arabic is added, followed by the addition of 50 grams of corn syrup solids to produce a viscous, smooth, sticky paste. This paste is then sprayed, under pressure, into a mixing vessel containing 1,750 grams of 100 mesh gum arabic. A dry powdered material results. When the mix is screened, an encapsulated material is obtained with an oil content of 5% for a total yield of 480 grams.

A sample of this material was tested by putting a portion of the yield in an open tray in an incubator at 40° C. for 12 hours. Only a very slight loss was observed; however, this loss is probably due to the slight amount of acetaldehyde that was adsorbed on the surface of the particles.

EXAMPLE 3

Encapsulation of Alpha Furfural Mercaptan

This product is chosen as an illustration of another flavor chemical that is very difficult to encapsulate efficiently because of its special characteristics. This material has a very powerful and objectional odor unless it is highly diluted. At 1 or 2 ppm. it possesses a decided coffee aroma and taste. It could, therefore, be an excellent additive to fortify instant coffee if the capsules would not leak and accumulate in the jar upon long standing. If the odor should accumulate, it would produce an objectionable odor reminiscent of onions. The following example will show that by forming sufficient and impermeable films around the particulate it is possible to obtain the desired results.

50 grams of Purity Gum B E, a treated starch product of the National Starch and Chemical Co., is dissolved in 100 grams of water. To this is added 25 grams of a 10% propylene glycol solution of alpha furfural mercaptan. This is mixed at 5° C.; 25 grams of gum arabic is added, followed by the addition of 50 grams of corn syrup solids to produce a viscous, smooth, sticky paste. This paste is then sprayed, under pressure, into a mixing vessel containing 1,750 grams of 100 mesh gum arabic. A dry powdered material results. When the mix is screened, an encapsulated material is obtained with an oil content of 0.5% for a total yield of 480 grams.

A sample of this material was tested by putting a portion of the yield in an open tray for a few hours to allow the adsorbed traces of the material on the surfaces to escape and leave the capsules. The resulting product was kept in an enclosed jar for weeks with no noticeable development of offensive aromas in the jar. However, when a few particles were dissolved in water the pleasant aroma of fresh coffee was obtained.

EXAMPLE 4

Encapsulated Coffee Product Made from 100% Coffee Ingredients

The retention of coffee aroma volatiles is a major problem for the instant coffee industry. The present method that is widely used is to spray some of the coffee oil that has absorbed some of the coffee aromas, onto the instant coffee. This helps to produce a good coffee aroma in the sealed jars but most of this escapes once the jar has been opened.

A further problem is that in order to have the product called coffee or instant coffee, all the ingredients utilized must be derived from coffee. This eliminates the possible use of the usual encapsulating materials. However, the following example discloses a method of encapsulating the coffee aromas by the use of this process.

40 grams of instant coffee were dissolved in 20 grams of the front distillate fraction of a coffee extract distillation. To this was added, while mixing, 15 grams of coffee oil. This was well mixed to form a smooth, viscous, and sticky paste. This was then sprayed, under pressure, into a mixing vessel containing 525 grams of pulverized instant coffee. (The high temperature and pressure used in extracting conventional instant coffee causes the cellulose materials in the roasted coffee beans to break down into dextrins and sugars. It is this dextrin and water-soluble resins in the instant coffee which act as the film forming, or encapsulating agent in this case.) A fortified instant coffee was produced with an oil content of 2.5%. This can be further mixed with an equal amount of instant coffee to produce an excellent product. This powder can also be screened to obtain a coffee powder with a 5% oil content.

EXAMPLE 5

Encapsulated Coffee Product Made without Water

The presence of moisture has a deleterious effect on coffee aromas. This problem can be circumvented by the use of this process in the following manner.

30 grams of coffee oil were added to 40 grams of glycerine and mixed. To this were added 15 grams of instant coffee to form a thick sticky paste. This was sprayed, under pressure onto 495 grams of instant coffee that had been pulverized. A fine dry coffee powder was produced with an oil content of 3.5%.

If too much of the coffee oil is added to instant coffee, the resultant beverage could have a cloudy appearance and possibly some oil floating on top. These objections can be overcome by extracting the coffee aromas from the coffee oil by the use of alcohol, or alcohol mixed with glycerine. A concentrate of this could be encapsulated by the methods described heretofore.

EXAMPLe 6

Encapsulation of Ethyl Vanillin to Produce a Nonbakeout Flavor

A good amount of flavoring ingredients are lost in the baking process due to the steam distillation of the volatile flavor ingredients of the baking temperature. These losses could be overcome if it were possible to keep the flavor oils from coming into contact with the water of the dough mix until the end and then only slowly. Also, where yeast fermentation is involved, the release of flavoring oils during the raising process has a detrimental effect on the taste of the final products. These problems are overcome by forming capsules according to this process as exemplified by the following.

40 grams of benzyl alcohol, 50 grams of propylene glycol, and 30 grams of ethyl vanillin were mixed and dissolved, and this was heated to 110° C. 10 grams of ethyl cellulose were added to this mixture and dissolved. A thick liquid was produced. This was then cooled to 60° C. and 20 grams of ethyl alcohol were added. This cooled and thinned out the liquid. This mix was further cooled to room temperature to produce a smooth, viscous and sticky paste. This was sprayed, under pressure, into a mixing vessel containing 1,350 grams of pulverized ethyl cellulose that had passed through a 100 mesh screen. This was well mixed and allowed to set for a few hours. A fine powdered product resulted. This was screened and a 12% ethyl vanillin content encapsulated flavor was produced.

Some of this powder was added to water and heated. No aroma of vanilla was evident until almost the boiling point of the water was reached. The aroma grew stronger on further heating. This flavor was being released slowly as would be the case in baking.

EXAMPLE 7

Encapsulation of Fumaric Acid

This process can also be used to encapsulate particles that are not dissolved in the solvent by forming a viscous, sticky slurry. This is applicable for the coating of acids such as citric acid and the slightly soluble acids such as fumaric acid.

To 50 grams of heavy corn syrup are added 10 grams of water and mixed. 60 grams of finely pulverized fumaric acid is added gradually, while mixing to form a smooth, viscous and sticky slurry. This slurry is then sprayed, under pressure, into a mixing vessel containing 100 mesh gum arabic. This is mixed for a few minutes and then passed over a 100 mesh screen. A yield of 242 grams of encapsulated powder is obtained with a fumaric acid content of 25%.

EXAMPLE 8

Encapsulation of Concentrated Orange Juice

This process can also be readily utilized for the encapsulation of concentrated orange juice, tomato paste and similar products. An encapsulated orange juice concentrate powder would be a desireable product for mixes, etc., since it would be in powder form with most of the volatile flavors entrapped. Powdered juices are commercially avilable, but these have been prepared by dehydration which necessitates the use of vacuum distillation, with the result that most of the volatile flavors are lost. The concentrated juices can be put into a powdered form with the volatile flavors intact by the use of this process as will be described by the following example.

100 grams of 65 Brix concentrated frozen California orange juice was thawed from its frozen state and brought up to room temperature. 50 grams of corn syrup solids were then added to the juice and mixed to form a smooth, viscous and sticky paste. This was then sprayed, under pressure, into a vessel containing 1,350 grams of gum arabic which had passed through a 100 mesh screen. This mixture was then screened to produce 265 grams of powdered orange juice as the yield. This product is readily soluble in water and can be used to reconstitute a juice beverage.

EXAMPLE 9

This example illustrates the differences in films formed from sugars and starches and the substantially non-friable, encapsulating films produced in the present invention.

A microscope glass slide was prepared for each of the following materials by wetting the slide with a thin layer of water or alcohol and sprinkling the wet slide with the material. After the slides were allowed to set for a few minutes the excess powder was shaken off. Upon examination a dry film was observed on each slide, however, the films formed from sugars and starches were brittle whereas the other films were pliable and could be peeled from the slide. The results were as follows:

| Material | Solvent | Condition |
| --- | --- | --- |
| 10 X sugar | water | brittle |
| starch | water | brittle and flaky on drying |
| carboxymethyl cellulose | water | pliable and clear |
| ethyl cellulose | ethanol | pliable |

EXAMPLE 10

Films or coatings or encapsulated citrus oils should be impermeable in order to avoid leakage of the oils therethrough, and the subsequent oxidation of the oils which produces a strong, undesirable, terpy aroma and flavor.

Conventional encapsulated citrus powders produced mainly by the spray dry method, or the Sunkist type process, are susceptible to such oxidation whereas encapsulated materials produced according to the present invention are not. The following tests will illustrate these differences.

With the spray dry method, citrus oils are emulsified with a large excess of gum arabic and then dried by spray drying. This forms fine powders which are in reality clusters of small particles, usually around 5 microns, surrounded by the films of gum arabic. At best, this is a random process since the oil particles close to the surface of the powder possess very thin films.

In the Sunkist and similar type methods the citrus oils are dispersed in hot, liquified corn syrup usually containing an emulsifier and glycerine. It is then forced through small openings into cold isopropyl alcohol. This solidifies the mass which is then ground and washed with the alcohol, followed by drying to remove the solvent. This procedure removes the citrus oils which may be on the surface of the particles.

Samples of commercial encapsulated orange powders made by both the spray dry and Sunkist type methods were selected and stored in containers at room temperature for 1 year. All the samples of spray dried powders contained some evidence of oxidized terpenes and most were unfit for use. The samples made by the Sunkist type methods varied from very slight to quite noticeable evidence of oxidized terpiness. However they had all clumped somewhat and one large sample which was kept in a plastic bag turned into a plastic mass.

An encapsulated orange oil product is produced according to the present invention as follows: 4 ounces of gum arabic is dissolved in 8 ounces of water. To this is added 4 ounces of orange oil while mixing to produce an emulsion. To this mixture is added 2 ounces of gum arabic and 6 ounces of 10 DE corn syrup solids and mixed to produce a smooth viscous and tacky mass.

To a Patterson-Kelly Mixer, fitted with a special centrifugal bar with 0.1 inch shims, 8 pounds of finely powdered gum arabic is added and the prepared tacky mixture is then sprayed into this mixer. Mixing was continued for 5 minutes and then screened. An encapsulated orange powder was obtained with a 16% oil content.

Some of this powder was kept at 45° C. for 24 hours in open and close jars. No loss of flavor was evident upon examination.

Samples of encapsulated orange powder made by the present process were selected and stored for 1 year under the same conditions, i.e., at room temperature. At the end of this period these samples showed no evidence of oxidation and were in perfect condition. The powders were free flowing, dissolved readily in cold water, and although some had been kept in open jars, these also were in perfect condition.

These samples were tested again after 2 years and they were all still in perfect condition.

I claim:

1. A process for encapsulating a material which tends to deteriorate upon exposure to auto-oxidative, humid or thermal conditions which comprises
  forming said material in or as a viscid or gel-like medium,
  dispersing said medium as particulates having a tacky consistency in an environment containing an agitated quantity of a powdered, sorbent, film-forming agent selected from the group consisting of gums, carboxymethyl cellulose and ethyl cellulose so as to form an encapsulating, substantially non-friable film around each of said particulates, and
  recovering said encapsulated particulates.

2. A process as defined in claim 1 wherein said medium is an emulsion.

3. A process as defined in claim 2 wherein said medium is dispersed by spraying into a vessel.

4. A process as defined in claim 3 wherein said medium is maintained at room temperature.

5. A process for encapsulating a material which tends to deteriorate upon exposure to auto-oxidative, humid or thermal conditions which comprises
  forming a viscid or gel-like suspension of said material,
  dispersing said suspension as tacky particulates into an environment containing an agitated quantity of a dry, powdered, sorbent, film-forming agent selected from the group consisting of gums, carboxymethyl cellulose and ethyl cellulose, whereby said agent adheres to the surface of said particulates and sorbs a sufficient amount of liquid from said particulates to form a continuous, substantially non-friable and dry, encapsulating film around each of said particulates, and
  recovering said encapsulated particulates.

6. A process as defined in claim 5 wherein said material comprises a volatile flavoring substance.

7. A process as defined in claim 5 wherein said recovered particulates are water-soluble.

* * * * *